Patented June 22, 1948

2,443,898

UNITED STATES PATENT OFFICE 2,443,898

POLYMERIC BETA-HYDROXYETHYL SILICONIC ACIDS

Ellsworth Knowlton Ellingboe, Wilmington, Del., assignor to E. I. du Pont de Nemours & Company, Wilmington, Del., a corporation of Delaware No Drawing. Application October 3, 1944, Serial No. 557,058

1 Claim. (Cl. 260—46.5)

This invention relates to polymeric organic silicon acids.

This invention has as an object the preparation of novel polymeric silicon-containing materials. A further object is the preparation of polymeric beta-hydroxyethyl siliconic acids. Other objects will appear hereinafter.

These objects are accomplished by the hydrolysis of the reaction product of silicon tetrachloride and ethylene, which reaction product is prepared in the presence of a catalyst containing aluminum chloride with mercuric oxide or chloride.

The following example illustrates a specific embodiment of this invention, but the invention is not limited thereto. In the example the parts given are parts by weight.

Example

An autoclave was charged with 100 parts of silicon tetrachloride, 3 parts of anhydrous aluminum chloride and 3 parts of mercuric oxide on mercuric chloride. Ethylene was added at a pressure of 225 lbs./sq. in. while the autoclave was agitated. After a reaction time of about 24 hrs. during which time the reaction vessel was maintained at approximately 25-35° C., no further absorption of ethylene was noted and the excess ethylene was vented. The reaction mixture was poured onto crushed ice giving as a precipitate the polymeric beta-hydroxyethyl siliconic acid. This acid was purified by extraction with hot xylene to remove any ethylene polymerization products that might have been present.

The product obtained essentially as described in the foregoing example upon analysis was found to contain 23.32% carbon, 4.58% hydrogen, and 58.99% $SiO_2$. Comparison for the values of the product obtained by hydrolysis of the monomer, i. e., $HOCH_2CH_2Si(OH)_3$—(19.35% carbon, 6.45% hydrogen and 48.4% silicon dioxide) and those for the completely polymerized material, i. e.,

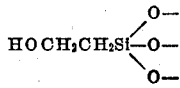

unit formula $C_2H_5SiO_{5/2}$—(24.75% carbon, 5.15% hydrogen and 61.9% silicon dioxide) indicate that a fairly high degree of polymerization was obtained. The material obtained as described above contained less than 1% of chlorine.

If a hydrolysis product is prepared essentially as described in the foregoing example except that the hydrolysis is carried out in a 15% sodium hydroxide solution, the polymeric material that is obtained has a higher carbon-hydrogen content and a slightly lower silicon content. Such values indicate that the latter material is a polymeric bis-beta-hydroxyethyl siliconic acid containing some tris-beta-hydroxyethyl siliconic acid. The term "bis" is employed in accordance with Rule 67 of the Rules of Organic Nomenclature to indicate two beta-hydroxyethyl radicals per one silicon atom in the recurring units of the polymer. The term "tris" is similarly used to indicate three beta-hydroxyethyl radicals to the one silicon atom in the compound.

The hydrolysis may be accomplished by treating the polymerization product with water at 0-100° C. at ordinary or superatmospheric pressure. Cold aqueous hydrochloric acid may be used as may alkali metal hydroxide solution of concentration as high as 40% or even higher.

The addition of ethylene may be carried out at ethylene pressures of about one atmosphere and preferably below 100 atmospheres. Lower pressures result in lower rates of reaction while higher pressures may result in the formation of low molecular weight liquid ethylene polymers. The reaction may be carried out at temperatures of from 0° C. to about 100° C. The catalyst employed consists of anhydrous aluminum chloride-mercuric chloride or mercuric oxide. It is preferred that both mercuric chloride and mercuric oxide be present during the reaction.

The following equation illustrates the probable reaction of silicon tetrachloride and ethylene followed by hydrolysis to give the polymeric siliconic acid.

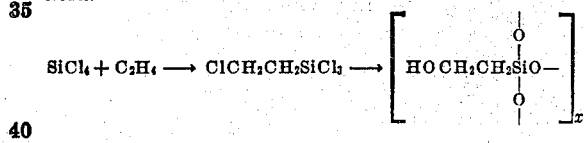

The products of this application may be used as fillers in plastic compositions, particularly where improvements in electrical properties and resistance to elevated temperatures are desired.

The above description and examples are intended to be illustrative only. Any modification thereof or variation therefrom which conforms to the spirit of the invention is intended to be included within the scope of the claim.

What is claimed is:

Polymeric beta-hydroxyethylsilanol of the unit formula

prepared by reacting ethylene at 225 lbs. per square inch at 25-35° C. with silicon tetrachloride in the presence of an aluminum chloride-mercuric oxide-mercuric chloride catalyst followed by hydrolysis of the product of the reaction by contact with ice.

ELLSWORTH KNOWLTON ELLINGBOE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,219 | Rochow | Oct. 7, 1941 |
| 2,258,220 | Rochow | Oct. 7, 1941 |
| 2,379,821 | Muller et al. | July 3, 1945 |

FOREIGN PATENTS

| Number | Country | Date |
|---|---|---|
| 44,934 | Russia | Nov. 30, 1935 |

OTHER REFERENCES

Fischer et al.: Chemical Abstracts, vol. 3, 1911, pages 3685 and 3686, abstract of Ann., 383, pages 337 to 363.

Meads et al.: J. Chem. Soc. (London), vol. 105, 1914, pages 679 to 690; ibid., vol. 107, 1915, pp. 459 to 468.